(12) United States Patent
Wright

(10) Patent No.: US 7,740,279 B2
(45) Date of Patent: Jun. 22, 2010

(54) SHOULDER RESTRAINT ATTACHMENT DEVICE

(76) Inventor: Wayne H. Wright, 419 314 1/4 Rd., Palisade, CO (US) 81526

( * ) Notice: Subject to any disclaimer, the term of this patent is extended or adjusted under 35 U.S.C. 154(b) by 619 days.

(21) Appl. No.: 11/545,645

(22) Filed: Oct. 10, 2006

(65) Prior Publication Data

US 2008/0084056 A1 Apr. 10, 2008

(51) Int. Cl.
*B60R 22/00* (2006.01)
(52) U.S. Cl. .................... 280/808; 297/468; 297/483
(58) Field of Classification Search ................. 280/808; 297/468, 483
See application file for complete search history.

(56) References Cited

U.S. PATENT DOCUMENTS

| 2,307,080 | A | 1/1943 | Schaefer |
| 3,053,300 | A | 9/1962 | Quinto |
| 3,878,599 | A | 4/1975 | Ladouceur et al. |
| 4,295,765 | A | 10/1981 | Burke |
| 5,564,873 | A | 10/1996 | Ladouceur et al. |
| 6,641,229 | B1 | 11/2003 | Kosak |
| 6,874,818 | B2 | 4/2005 | Crimmins et al. |

*Primary Examiner*—Eric Culbreth
(74) *Attorney, Agent, or Firm*—Dorr, Carson & Birney, P.C.

(57) ABSTRACT

A shoulder restraint attachment device for a motor vehicle (comprising a bolt, a mandrel, a cup and a nut) can be employed to deform a portion of the motor vehicle's roof in such a manner that a shoulder strap, such as those employed in three point restraint systems, can be securely and aesthetically mounted to the motor vehicle roof.

7 Claims, 7 Drawing Sheets

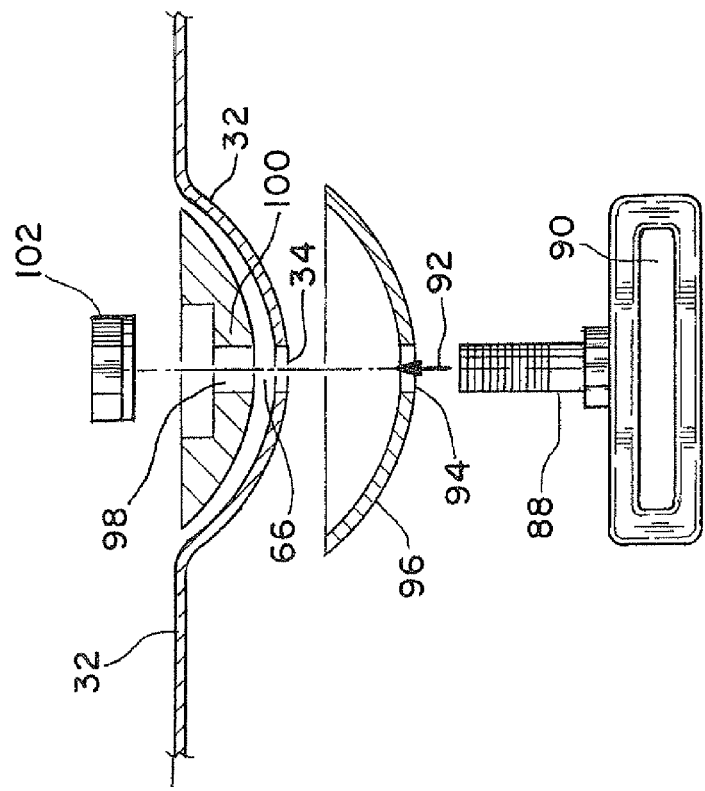
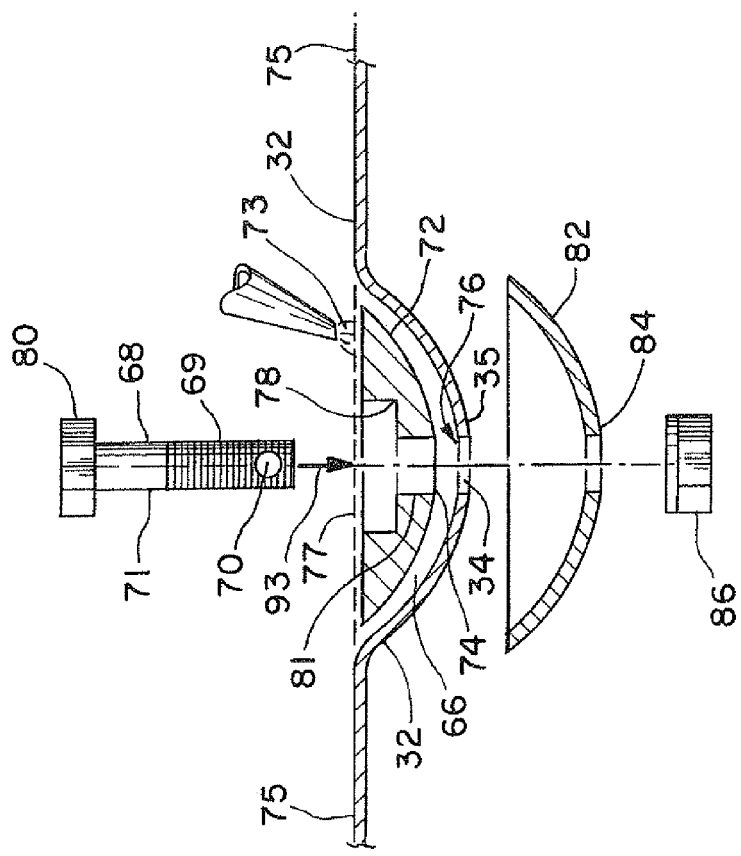

SHOULDER RESTRAINT ATTACHMENT DEVICE

BACKGROUND OF THE INVENTION

Automobile manufacturers have been charged with providing increasing levels of safety, especially over the past 40 years. One of the more dramatic improvements in their safety endeavors was introduction of devices that serve to restrain a vehicle user's movement in the event of a violent collision. The first such devices were lap-type seatbelts. They were eventually followed by introduction of three point restraint systems that, in addition to a lap belt, further comprised a second belt that served to restrain movement of the vehicle user's upper torso in the event of a violent collision. They are generally positioned above and behind the user's shoulder regions. Such devices are now commonly referred to as shoulder restraints, shoulder restraint belts, shoulder straps, etc. The standards covering their use and capabilities are found in Federal Motor Vehicle Safety Standards 208, 209 and 210.

Starting in 1968 three point restraint systems were mandated for all automobiles sold in the United States. Such restraint systems were not required in trucks until 1972. Be that as it may, this implies that pre-1968 automobiles have, by today's standards, inadequate restraint devices. This circumstance is usually exacerbated by a general lack of padding on the steering wheels and dashboards of these earlier automobiles. Thus, using only lap-type seatbelts, a pre-1968 automobile user's upper torso is unrestrained and, hence, in the event of a collision, subject to severe impacts. Consequently, various shoulder restraint retrofit assemblies have been suggested for use in pre-1968 autos. Their use often involved adding an anchor (i.e., a strong seat belt attachment point) to a vertical frame member (e.g., a door frame member) of the auto in positions that are generally located above and outboard of (i.e., to the side of) the auto seat being serviced by such a vertical frame mounted safety belt. It might also be noted here that use of such vertical frame member mounting locations is, in the opinion of some auto safety experts, less preferred (from a safety point of view) relative to anchoring such torso restraining safety belts more inboard (i.e., more directly behind the user's shoulder) as opposed to anchoring them more outboard of (i.e., to the side of) the user's shoulder e.g., mounting them on a vertical door frame member).

Consequently, other prior art three point restraint retrofits involved drilling a hole in the automobile roof more directly behind the restraint user's shoulder. A bolt was then passed through the hole in the vehicle's sheet metal roof to provide a reliable shoulder restraint anchor point. Again, these anchor points were located more directly to the rear of the user's shoulder (relative to mounting the anchor on the auto's door frame). However, the bolt head of such systems (and usually a washer placed behind that bolt head) is readily visible above the outside roof surface of the vehicle. This circumstance creates an aesthetically displeasing outside appearance of the roofline of the vehicle.

Another fairly common three point restraint system that was located more to the rear of the user's shoulder involved welding an anchor (e.g., a metal plate) to the inside of a motor vehicle roof at a more inboard location. This type of retrofit device has several drawbacks. For example, the heat required to weld an anchor piece to the roof of a vehicle will seriously discolor and/or blister the roofs outer paint finish over a relatively wide area. Moreover, since the headliner and roof insulation of such vehicles will often melt or burn when exposed to welding temperatures, use of this anchoring method implies that the roof will have to be relatively more extensively repaired and repainted. Moreover, when welding is employed, the vehicle's flammable headliner materials (e.g., insulation) must be removed and reinstalled, or completely replaced. Additionally the strength of many such anchor welds (especially when carried out by non-professional welders) have proven to be inadequate in some high impact collision situations.

Next, it should be noted that the patent literature discloses several devices and methods for forming a cavity in a sheet of metal. Some of these are employed in automotive applications. For example, U.S. Pat. No. 4,295,765 teaches a tiedown structure 10 having (1) a body member 12, (2) a plug 14 and (3) a threaded member such as a nut. The body member 12 has a top wall 12a, an outwardly flaring side wall 12b and an externally threaded stem 12c. An axial, internally threaded, portion 12d extends partly within the body member 12. The body member 12 also is provided with a cavity 12e below the top wall 12a for receiving a tightening tool head such as a hex wrench. The plug 14 has an unthreaded axial passageway 14a that opens into an outwardly flaring inner wall 14b. This wall 14b is complementary in shape to the outwardly flaring side wall 12b of the body number 12.

U.S. Pat. No. 6,874,818 B2 teaches an energy absorbing seat belt anchorage system wherein, as shown in FIG. 4, said system has a nut 24 that is pressed against a transverse wall 28 of a housing 18 by a retainer washer 86. A bolt 38 will be tightened to draw a tapered side 36 of the nut 24 into firm surface-to-surface contact with a tapered surface 30 of the transverse wall 28 of the housing 18. Crush ribs 68 overlie the head 44 of the bolt 38. A shoulder 48 of a collar 46 is closely adjacent to the abutment ring 32. In a crash situation, and specifically when a side collision occurs, the bolt is forced outwardly as depicted in FIG. 6. The shoulder 48 of the collar 46 deforms and bends the abutment ring 32 outwardly. The crush ribs 68 crush against the head 44 of the bolt 38. The resistance of the abutment ring 32 to bending absorbs energy. The crushing of the ribs 68 contributes to the absorption of energy.

U.S. Pat. No. 6,641,229 B1 teaches that a boss pulled into a socket hole in a wheel under the action of a bolt on stud on the nose of the boss can cause plastic deformation in a metal sheet (e.g., a sheet made of steel).

U.S. Pat. No. 5,564,873 teaches a self-attaching fastener and method for its attachment wherein an installation head 70 receives a fastener element for installation in a metal panel 60. The installation head includes a nose member 72 having a bore 73 that, in turn, receives a reciprocal plunger 74. A free end of the plunger is driven against a driven surface 42 of the fastener 20. This action drives the free end of a barrel portion 26 into the panel 60. The plunger 74 includes a cylindrical piercing bore 75 that receives a piercing end 77 that pierces the panel.

U.S. Pat. No. 3,878,599 discloses a method for fastening a nut to a panel. The panel is deformed into a recess in the nut by advancing a punch against the panel. The punch is advanced into a tool receiving recess in the bottom of the recess beyond a panel edge.

U.S. Pat. No. 2,307,080 teaches a method of attaching panels to a framework. A panel to receive the fastening devices is provided with holes 4 that are counter-bored (see FIG. 7) to provide frusto-conical portions 5 and 6 for reception of a nut such as that shown in FIG. 11.

U.S. Pat. No. 3,053,300 teaches a fastener device wherein an anchor nut is mounted on a piece of sheet metal 30. A hole 32 is drilled in the sheet metal 30, and an annular shank 14 is inserted therein. A mounting tool is then used to deform the extremity 22 of the annular shank 14 over the periphery of the hole 32. This deforming step forces the lower surface of the periphery of the hole to conform to an underlying surface 16.

SUMMARY OF THE PRESENT INVENTION

The herein described invention provides relatively more simple, relatively less expensive, better anchored and more aesthetically pleasing shoulder restraint systems (and especially three point shoulder restraint systems) compared to those prior art devices and methods previously described. Applicant's invention involves deforming (stretch forming) a portion of a metallic vehicle roof in a manner such that a downwardly directed cavity is created in the outside surface of the vehicle roof. This cavity can have a depth such that the top portions of Applicant's shoulder restraint attachment device e.g., its bolt head, will be below the roofs contour line when said roof is viewed from the side of the vehicle. That is to say that the contour of the roofline will not be marred by the presence of an unsightly bolt head.

Applicant's process for forming such a cavity in the sheet metal constituting a portion of a motor vehicle roof requires a mechanically cooperating assembly having four main components; a bolt, a mandrel, a cup and a nut. The bolt will have a head, a shaft and threading. The top surface of the bolt can be flat or curved. In all cases, the bolt will be of rugged construction and made of a tough material such as a specialty steel, titanium, various polymeric materials having the qualities of strength and toughness. The mandrel can have a flat base or a curved base whose outside surface leads into an appropriately sized, dome shaped, nose piece of sufficient strength and toughness (e.g., by virtue of being made of an appropriate strong, tough material such as steel, titanium, an appropriately strong, tough polymer, etc.) to deform the sheet metal (sheet steel, aluminum, etc.) from which the vehicle roof is made. The mandrel will also have a hole capable of passing the stem of the bolt. This hole can be unthreaded or threaded.

The cup piece will have a shape such that the bowl or interior of the cup will generally have the inverse size and shape of the mandrel nose region—given that the sheet metal of the vehicle roof will have to be compressed between the mandrel nose region and the interior of the cup (i.e., the cup's interior surface will generally be complementary to the exterior surface of the mandrel nose region—given the presence of the deformed sheet metal roof material). The cup also is provided with a hole capable of passing the bolt's shaft. This hole can be unthreaded or threaded to accommodate the bolt threads. The cup also can be made of a strong, tough material such as a specialty steel, titanium, polymer, etc. The cup piece also can be widely flanged where it contacts the inside of the roof and thereby preventing unwanted additional deformation of the roof outside of the mandrel's footprint region.

The fourth main component is a nut that is threaded to receive the threads of the bolt. The bolt/nut combination will be of sufficient size and strength to drive the mandrel toward the cup with a force sufficient to deform the metal (e.g., sheet steel) from which the vehicle roof is made. To these ends, the bolt also should be of rugged construction and made of a strong, tough material such as steel, titanium, an appropriate polymer and the like.

The actual vehicle roof deformation process is carried out as follows. First, an appropriate roof location is identified above the user of applicant's shoulder restraint device. This location can be behind, directly above or even slightly to the front of the user's shoulder region. This location also can be outboard of the user's shoulder. In any case, a hole of sufficient size to pass the bolt shaft is then drilled in the vehicle's roof at the selected location. The mandrel is then placed above the hole on the outside surface of the automobile roof The cup is then placed on the inside surface of the metal sheet that forms the roof in a position immediately below the hole. The bolt is then passed through the mandrel, roof and cup. The nut is then threaded onto the bolt. The nut and bolt are then torqued together to force the mandrel downward toward and into the cup. That is to say that the cup rim produces a countervailing force on the underside of the roof sheet metal and the mandrel forces that sheet metal downward such that the nose region of said mandrel is forced toward and into the bowl of the cup thereby deforming the sheet metal from which the roof is made into the bowl or interior of the cup. Ideally, the mandrel base will be driven downward to a level that is substantially flush with, or below, the top rim of the cavity created in the roof top.

After this roof deforming process is completed, the components used to create the cavity in the roof can be left in place and further employed to mount a shoulder restraint holder to the bolt. In the alternative, any one or all of the main components described above can be removed and replaced with other components hereinafter more fully described. Indeed, the mandrel and/or the cup might be permanently removed from the assembly of components. In some embodiments of this invention, the cup may be replaced by a shoulder restraint holder.

Further alternative embodiments of this invention might include a recess (e.g., a countersink) in the base of the mandrel in order to allow the bolt head to lay flush with, or below, an exterior roofline as seen in a side view of the automobile. This recess also can be large enough to allow a tool such as a wrench head or socket to better grasp the head of the bolt. In an alternative embodiment of this invention, the bolt head can be provided with a curved top surface and completely fill a countersunk region in the mandrel. In still other embodiments of this invention, the bolt head might be provided with an opening configured to receive a tool head such as a screwdriver head, Allen wrench, etc. Moreover, a bearing surface could be used on the bolt head's lower surface and/or the nut's upper surface. Such bearing surfaces would serve to minimize frictional forces on the head of the bolt and/or on the nut during the torquing process.

After installation of applicant's shoulder restraint attachment device (or after installation of certain hereinafter more fully described alternative devices to the four main components described above) some form of auto body liquid or plastic filler known to the auto body repair and painting arts can be used to cover the bolt head, the flat surface of the mandrel, and any countersink in the mandrel base (if any are present). This body filler can be contoured to the roofline and painted to match the roofs color. Thus, the shoulder restraint attachment device would not be visible from the outside of the vehicle.

It might also be emphasized here that, relative to mountings that require welding, the vehicle roofs exterior paint would not be greatly damaged due to oxidation/discoloration or paint bubbling that would result from welding operations. Moreover, applicant's devices and methods for mounting them on a vehicle roof do not char or melt headliner materials on the interior roof of the vehicle. Nor do they require extensive headliner removal and/or replacement. Furthermore, their installation is not subject to weld strength variation due to the length of weld beads, the nature or quality of the welding materials and/or welding workmanship. The aforementioned devices and process for using them, also offer other advantages over existing restraint systems. For example, the material and size/shape of the mandrel piece can be easily designed to meet federally mandated strength requirements for shoulder restraint devices. That is to say that such designs could be readily tailored to the thickness/strength of the roof metal.

BRIEF DESCRIPTION OF THE DRAWINGS

FIG. 6 illustrates the use of certain alternative components that can be employed after the vehicle roof has been deformed to create a cavity therein.

FIG. 7 illustrates still other alternative components that can be employed after the vehicle roof has been deformed.

DETAILED DESCRIPTION OF THE INVENTION

Figure 1:
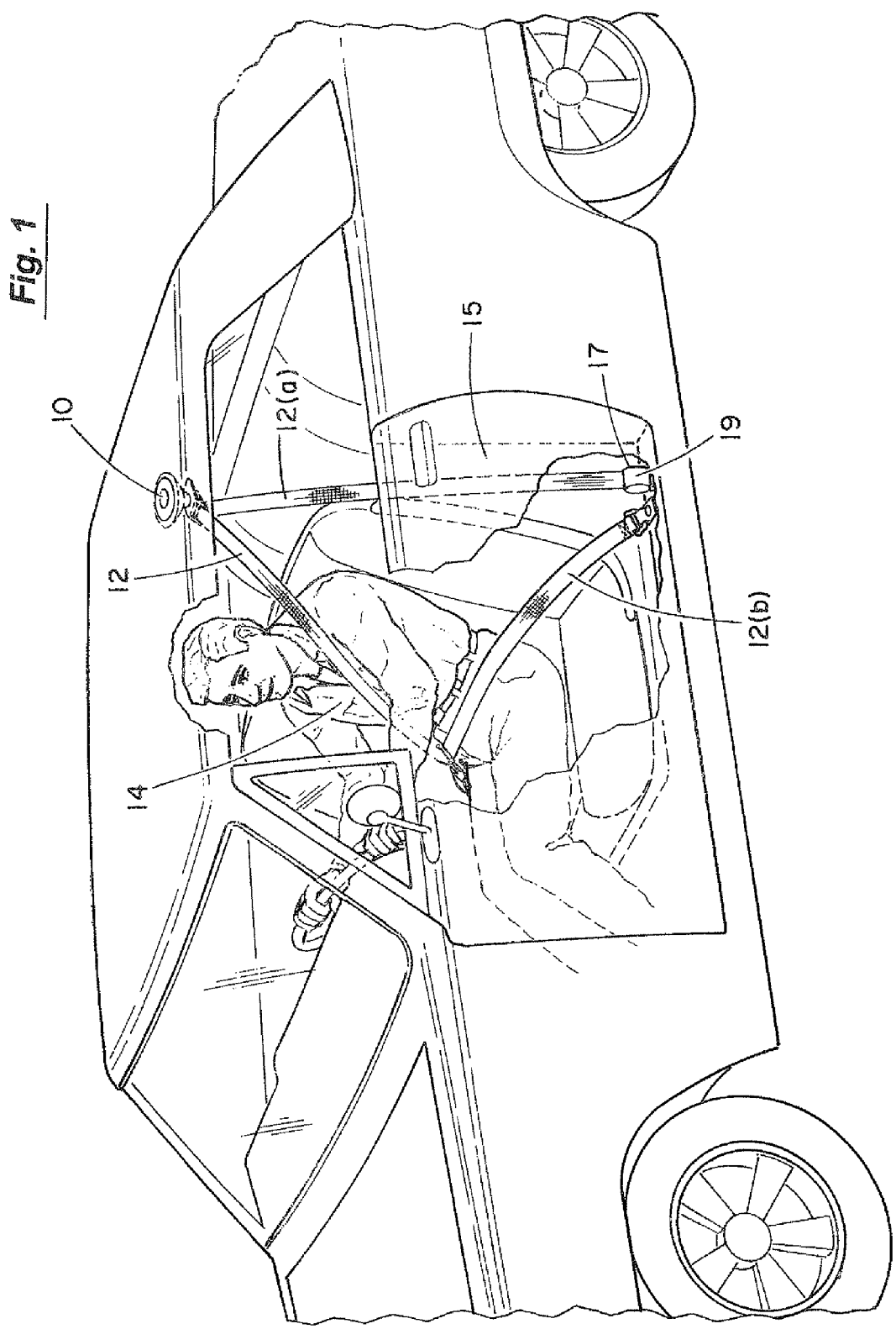
FIG. 1 depicts the shoulder restraint attachment device of this patent disclosure being employed in its intended use.

This invention is further illustrated by the following, more detailed, discussions of the drawings. For example, FIG. 1 is a perspective view, shown in partial cutaway, of a shoulder restraint attachment device 10 being used according to the teachings of this patent disclosure. This shoulder restraint attachment device 10 anchors a shoulder strap 12 that is shown being used by an automobile driver 14. This shoulder strap could terminate at the shoulder restraint attachment device 10 or it may slidingly pass through a shoulder restraint holder of a type hereinafter more fully described. That is to say that the shoulder strap 12 may pass through such a holder and continue downward as strap portion 12(a). At some lower location 17 a seat belt device 19 having a belt pass through slot (or belt roller) well known to the three point restraint manufacturing arts may be mounted on the floor or a door frame 15 of the automobile. Thereafter a seat strap portion 12(b) of the strap portion 12(a) of the shoulder strap 12 will lead over the auto user's lap and to a seat belt anchor on the auto floor (not shown) to create a three point restraint system.

In FIG. 1, the shoulder restraint attachment device 10 is shown attached to the roof of the automobile in a position that is generally depicted as being above and behind the left shoulder of the driver 14. Again, this roof location is more directly behind the user's left shoulder—relative to mounting such a restraint device 10 on a door frame 15 of that vehicle. However, it should be understood that Applicant's attachment device 10 can be located over a relatively wide region of the vehicle roof. Indeed, it might even be positioned above and slightly forward of the user's torso. In any case, the lower end of applicant's shoulder restraint device (or of a three point restraint system in which the shoulder strap 12 plays a part) can be attached to the floor (or a vertical frame member) of the automobile in ways well known to the seat belt restraint arts.

It also should be appreciated that such a device 10 could be employed in other types of motor vehicles having sheet metal roofs e.g., pickup trucks, station wagons, buses and the like.

Figure 2:
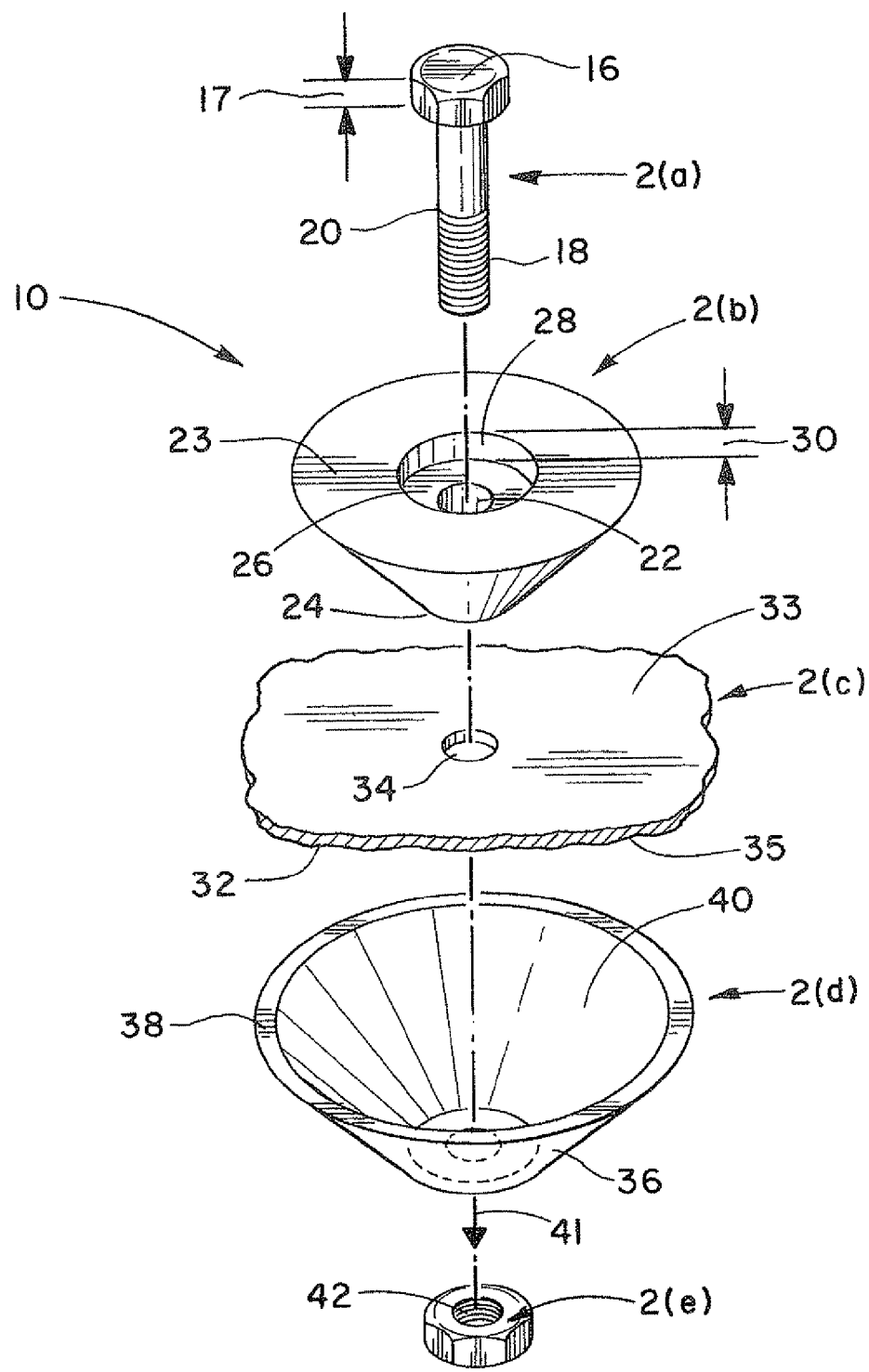
FIG. 2 is an exploded view of the four main components of applicant's shoulder restraint attachment device.

FIG. 2 is an exploded view of the four main components used to carry out the present invention. These four main components are respectively labeled 2(a), 2(b), 2(d) and 2(e). They are also shown in their relationship to a vehicle roof 2(c) that will generally comprise a piece of sheet metal (e.g., sheet steel, sheet aluminum, etc.) to which the shoulder restraint attachment device 10 of the present invention is attached. These four main components are used to create an assembly capable of creating a downwardly directed cavity in the motor vehicle's roof. After the cavity is created, these same four components can be used to anchor a shoulder restraint holder. In certain alternative embodiments of this invention, however, any one, or all of these four main components can be replaced by other mechanically analogous components in ways hereinafter more fully described. Indeed, after such a cavity has been created, the mandrel and/or cup components may be permanently removed from the assembly.

The first main component of applicant's shoulder restraint attachment device 10 is its bolt 2(a). By way of example only, this bolt 2(a) is shown as a machine bolt provided with a hexagonal head 16 having a height 17. Said bolt 2(a) is also shown provided with threading 18 that, again by way of example, is shown extending about halfway up the bolt's shaft or stem 20. This bolt should be made of a strong, tough material such as steel, titanium, a strong, tough polymer such as an acrylic type polymer, etc. Those skilled in this art will appreciate that other types of bolts (e.g., tap bolts, stove bolts, carriage bolts and the like) also could be employed in the practice of this invention. The top surfaces of such bolts may be flat or curved, especially in ways hereinafter more fully described. Moreover, these top surfaces of the bolt can be provided with openings to receive tool heads such as screwdriver heads, Allen wrenches and the like.

The second main component of applicant's shoulder restraint attachment device 10 is a mandrel 2(b). It too should be made of a very strong, tough material (e.g., steel, titanium, appropriately strong, tough polymers, etc.). This particular mandrel 2(b) is shown provided with a hole 22, a generally flat base 23 and a nose region 24 generally having an inverted dome configuration when oriented in the downwardly pointing direction shown in FIG. 2. The hole 22 passes through a middle or core region 26 of the mandrel and exits the mandrel's bottom (i.e., the leading or bottom surface of the inverted dome). This hole 22 may be threaded to accommodate the threading of the bolt 2(a), or the hole 22 may be unthreaded and of a diameter sufficient to allow passage of the stem 20 of the threaded bolt 2(a) through the hole 22 in the mandrel 2(b). Optionally, the flat base 23 of the mandrel 2(b) may be provided with a recess or countersunk region 28. This countersunk region 28 is shown having a depth 30 that can be equal to, or greater than, the height 17 of the head 16 of the bolt 2(a). Such an arrangement will serve to locate the bolt head 16 below the vehicle roofline contour as seen from the side of the vehicle. In an alternative embodiment of this invention, the flat base 23 is replaced by a curved top surface (e.g., as depicted as item 2(b)T(c) in FIGS. 3A and 3B).

Item 2(c) of FIG. 2 depicts a cross section of a sheet of metal 32 (e.g., a sheet of steel, aluminum, etc.) from which motor vehicle roofs are typically made. The sheet of metal 32 has a top or exterior surface 33 and a bottom or interior surface 35. This sheet of metal 32 is shown provided with a hole 34 capable of passing the shaft 20 of the bolt 2(a). This sheet of metal 32 is deformed in a downward direction by the mandrel 2(*b*) under a force provided by a torquing action provided by the bolt 2(*a*) and its hereinafter described cooperating nut 2(*e*).

The third main component of the shoulder restraint attachment device 10 is a cup 2(*d*). The cup 2(*d*) is also made of a very strong, tough material (e.g., steel, titanium, an appropriate polymer, etc.). It has a body 36, a rim region 38, and a hollow internal region 40 also having an inverted dome configuration. The size and internal shape of the cup's hollow internal region 40 will generally be complementary to the size and external shape of the nose region 24 of the mandrel 2(*b*)—given that the sheet of metal 32 will be deformed into an inverted dome configuration that, upon such deformation, will reside between the nose region 24 of the mandrel 2(*b*) and the hollow interior region 40 of the cup 2(*d*) in the manner generally illustrated in FIG. 3. Thus, the cup's hollow internal region 40 will generally serve to create and then limit the deformation of the metal being driven downward by the mandrel 2(*b*).

The fourth main component of the shoulder restraint device 10 is a nut 2(*e*) having threads 42 that threadedly receive and cooperate with the threads 18 of the bolt 2(*a*). The torque created by progressively tightening the threaded nut 2(*e*) on the threads 18 of the bolt 2(*a*) will create forces capable of compressing and deforming the sheet metal 32 of the vehicle roof between the nose region 24 of the mandrel 2(*b*) and the hollow interior region 40 of the cup 2(*d*). Such forces can be created by tools such as wrenches and sockets that may be hand operated or electrically and/or air powered.

Figure 3:
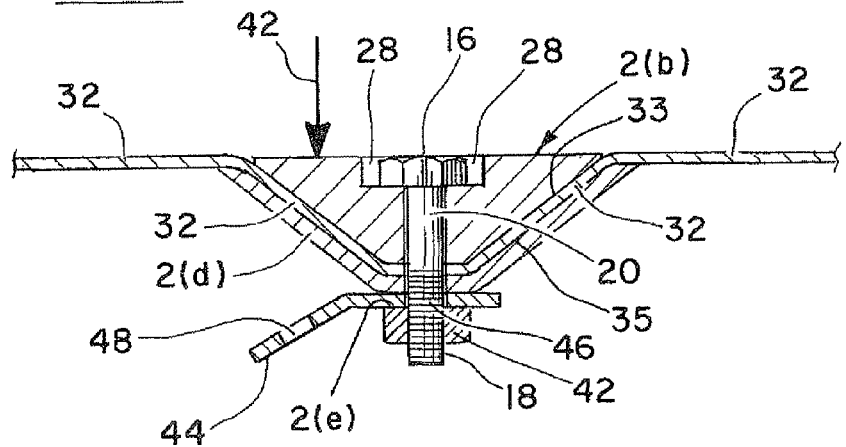
FIG. 3 illustrates the deformation of a sheet of vehicle roof metal through use of the present invention.

FIG. 3 is a cut-away side view that depicts the results of progressively torquing the bolt 2(*a*) to the nut 2(*e*). In effect, this torquing action compresses the sheet metal 32 between the mandrel 2(*b*) and the cup 2(*d*) thereby deforming the sheet metal 32 in a downward direction 42 such that the top surface 33 sheet metal 32 generally takes the configuration of the dome-like nose region 24 of the mandrel 2(*b*) and the bottom surface 35 of the sheet metal generally takes the shape of the interior hollow 40 of the cup 2(*d*). That is to say the deformed sheet metal 32 will, upon deformation, take the shape of a concave, downwardly directed, dome. FIG. 3 also depicts a shoulder restraint holder 44 (hereinafter more fully discussed) having a hole 46 through which the bolt shaft 20 passes and thereby mounting the shoulder restraint holder 44 between the bottom of the cup 2(*d*) and the top of the nut 2(*e*).

Figure 3A:
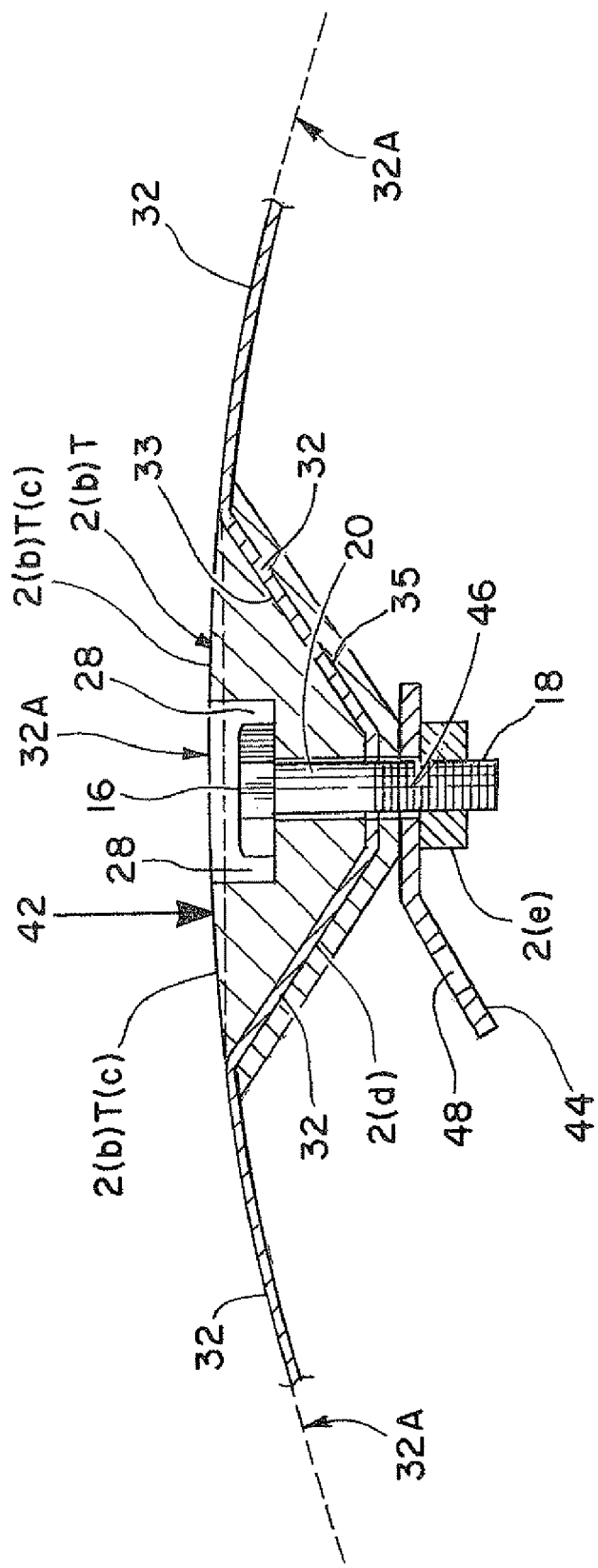
FIG. 3A depicts the deformation of a curved vehicle roof and use of a mandrel whose upper surface is generally curved to conform with the curvature of a vehicle roof.

FIG. 3A illustrates an alternative embodiment of this invention wherein the vehicle roof sheet metal 32 is shown having a curvature 32A. This curvature 32A is shown exaggerated for purposes of illustration. The top surface 2(*b*)T of the mandrel 2(*b*) also is shown having a curvature 2(*b*)T(c). Particularly aesthetic results will be achieved when the curvature 2(*b*)T(c) of the top surface 2(*b*)T of the mandrel 2(*b*) generally comports with the curvature 32A of the vehicle roof.

Figure 3B:
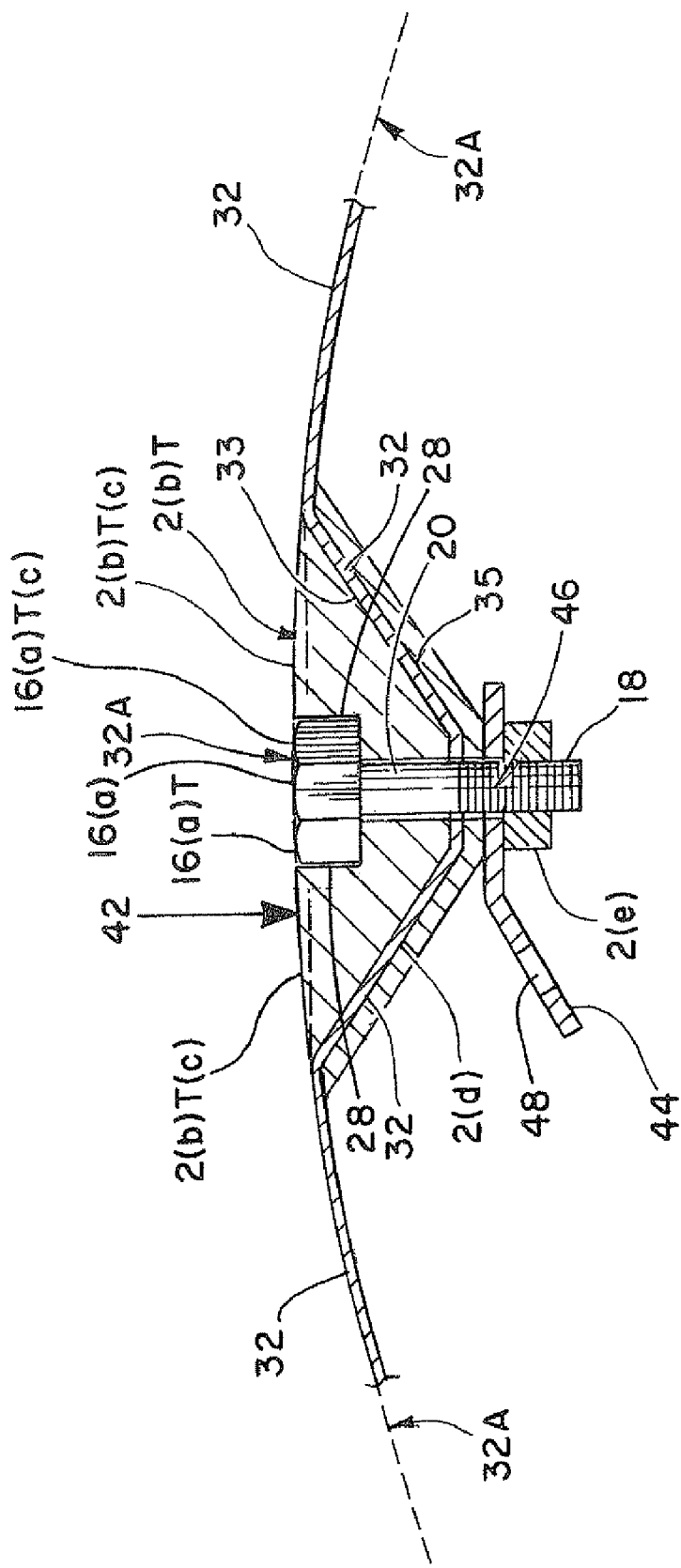
FIG. 3B depicts the use of a bolt whose top surface is curved to comport with the curvature of a mandrel.

FIG. 3B illustrates another alternative embodiment of this invention wherein a bolt head 16(*a*) completely occupies a countersunk region 28 of a mandrel 2(*b*)T. This bolt head 16(*a*) can be provided with a top surface 16(*a*)T having a curvature 16(*a*)T(c) that generally comports with the curvature 2(*b*)T(c) of the top surface of the mandrel 2(*b*)T.

Figure 4:
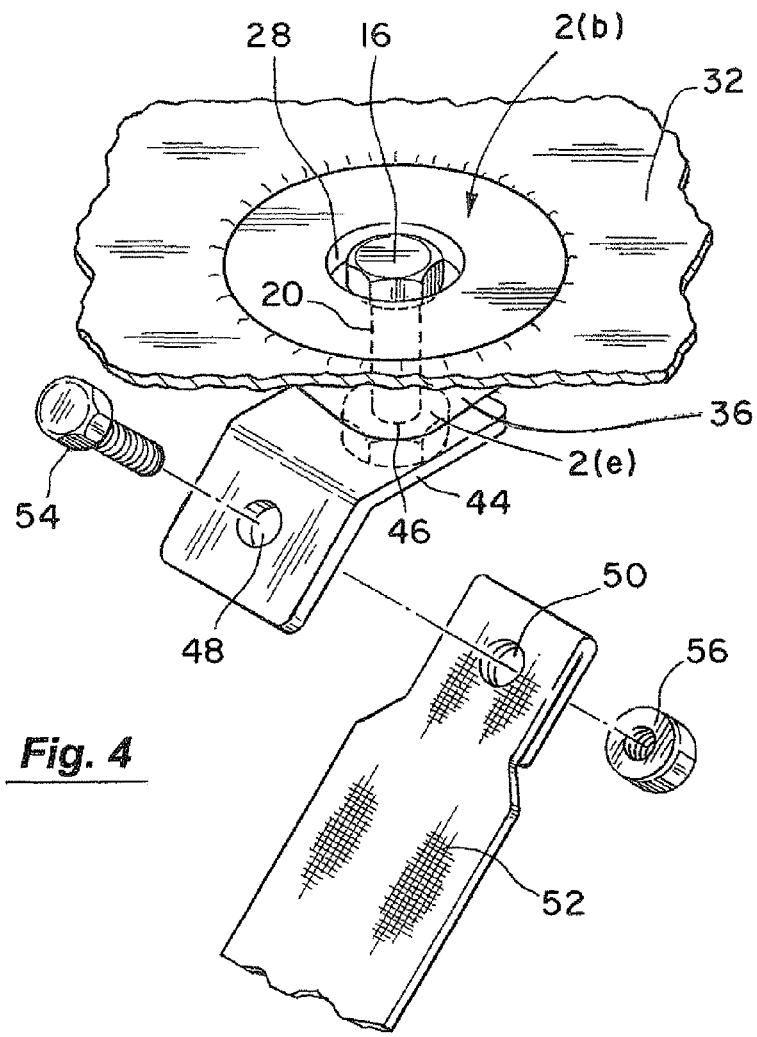
FIG. 4 is a top perspective view of applicant's shoulder restraint attachment device shown associated with a shoulder restraint holder. This figure also depicts a method for connecting a shoulder restraint strap to a shoulder restraint holder.

FIG. 4 depicts in a perspective view an embodiment of this invention wherein a shoulder restraint holder 44 is fixedly (i.e., terminally) attached to the bolt shaft 20. The bolt shaft 20 can, for example, pass through a hole 46 (see FIG. 3) in the shoulder restraint belt holder device 44. That is to say that the nut 2(*e*) depicted in FIGS. 2 and 3 can be removed from the bolt shaft 20 after the deformation of the rooftop metal 32 has been completed. The bolt shaft 20 is then inserted into the hole 46 in the shoulder restraint holder device 44. Thereafter, the nut 2(*e*) is again engaged with the threads 18 of the bolt 2(*a*) thereby securely mounting the shoulder restraint holder device 44 to the bolt shaft 20. Again, this arrangement is also depicted in the side view shown in FIG. 3.

The shoulder restraint holder device 44 is also, by way of example, shown provided with a second hole 48. This second hold 48 is intended to very generally represent a mechanical means by which a shoulder restraint belt, such as that depicted as item 12 in FIG. 1, can be fastened to a shoulder restraint holder device such as the one shown as item 44 shown in FIG. 4. By way of a further example, a hole 50 in a shoulder restraint belt 52 such as that shown in FIG. 4 could be aligned with the hole 48 in the shoulder restraint holder device 44 and a second threaded bolt 54 inserted into both holes (48 and 50). Thereafter, a threaded nut 56 can be secured to the second threaded bolt 54 thereby securely and terminally fastening the shoulder restraint belt 52 to the holder device 44 and ultimately to the bolt 2(*b*) that is, in turn, anchored to the roof of a vehicle. Such a hole 48 in the shoulder restraint holder 44 can of course be used to receive other mechanical devices for creating terminal fixing devices such as hooks, buckles, keepers, carabiners and the like.

Figure 5:
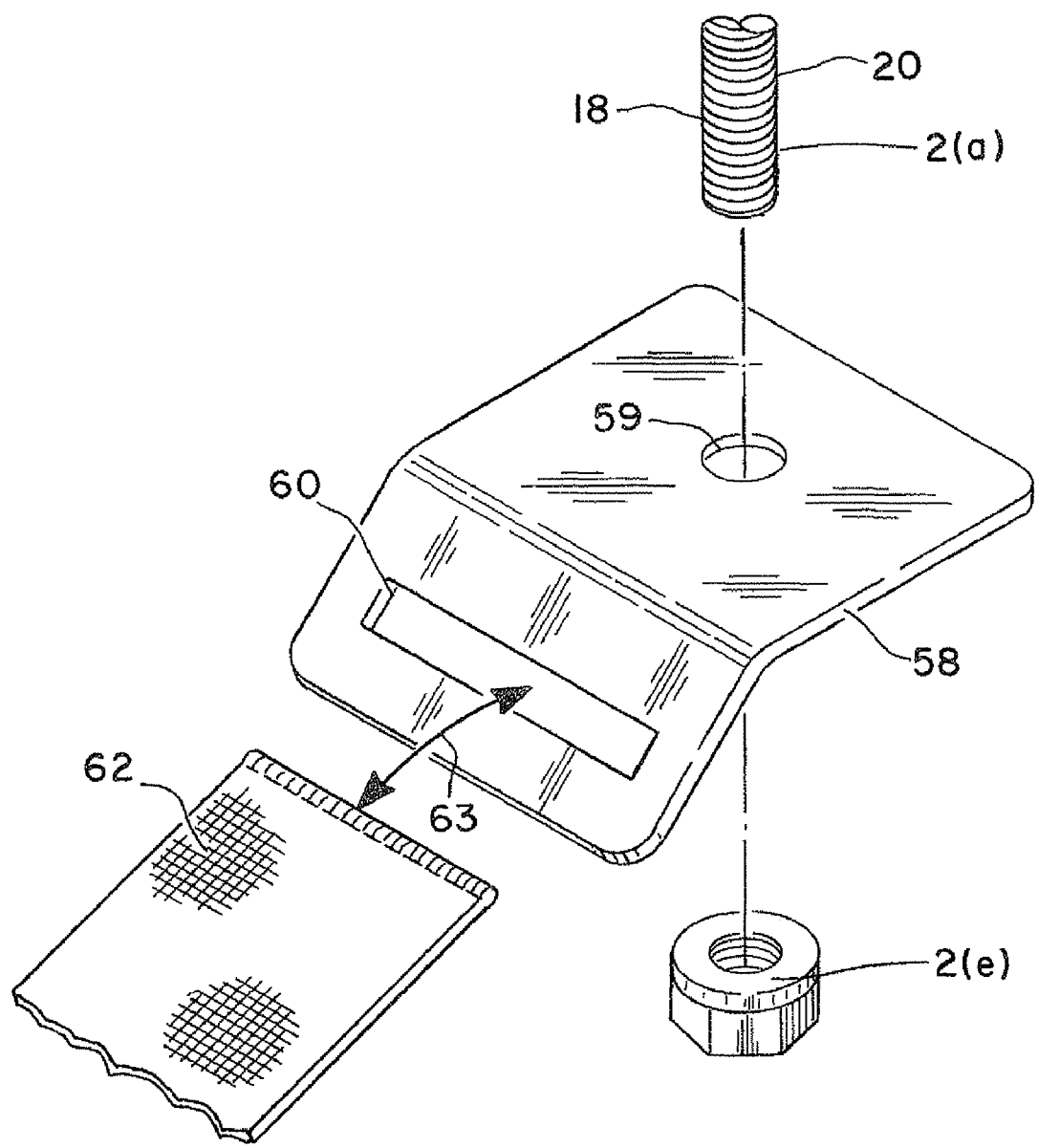
FIG. 5 depicts an alternative shoulder restraint holder.

FIG. 5 depicts an alternative shoulder restraint holder 58. This alternative shoulder restraint holder 58 is shown provided with a rectangular opening 60 through which a safety belt or strap 62 can pass in the manner(s) generally suggested by the two headed direction arrow 63. After looping through the rectangular opening 60 such a safety belt or strap 62 can be secured by belt buckle or belt keeper devices generally known to this art. Moreover, the two headed direction arrow 63 also is intended to suggest how a shoulder safety strap such as that depicted as item 12 (12A, 12B) in FIG. 1 can slide through such a rectangular opening 60 while said strap 12 functions as part of a three point restraint system such as that illustrated in FIG. 1. In other words, the belt 12 shown in FIG. 1 will not terminate at applicant's shoulder restraint attachment device 10, but rather slide through a slot (e.g., the rectangular opening 60 of the alternative shoulder restraint holder 58 of FIG. 5) and lead to another component of the three point restraint system such as the belt 12A passing through a seat belt passing component such as that suggested by item 19 in FIG. 1 and then to an extension of the belt e.g., belt portion 12B, that is depicted over the user's lap in FIG. 1.

FIG. 6 depicts the vehicle roof sheet metal 32 after it has been deformed by the methods and mechanical devices heretofore described. In effect, the vehicle roof now contains a downwardly concave cavity 66 having a generally inverted dome-like contour. FIG. 6 also shows how, in certain alternative embodiments of this invention, some or all of the mechanical components used to create the cavity 66 (e.g., the bolt 2(*a*), the mandrel 2(*b*), the cup 2(*d*) and the nut 2(*e*) depicted in FIG. 2) can be removed from the vehicle roof. For example, the mandrel and/or the cup may be permanently removed from the assembly. In other embodiments, any one of (or all of) the four mechanical components noted above can be replaced by certain other mechanically analogous components. For example, FIG. 6 depicts an alternative bolt 68 having some features different from the bolt 2(*a*) used to originally create the cavity 66. Such an alternative bolt 65 might, by way of example only, be provided with different threads 69, have a shorter shaft 71, be chrome plated and/or be provided with a mechanical means (e.g., a hole 70) to engage a shoulder restraint holder device of the general type depicted as item 44 in FIG. 4.

Moreover, the mandrel 2(*b*) of FIG. 2 could be replaced with a dome-shaped washer 72 of less rugged construction than the original mandrel 2(*b*). Such a washer 72 may have a dome-shaped nose region 74 having a size and configuration such that it too will generally conform to the top surface 76 of the dome-shaped cavity 66 in the vehicle roof. This washer 72 may also be provided with a countersunk region 78 to receive the head 80 of the alternative bolt 68. The top of such a washer 72 may be flat or have a curved top surface. A hole 81 in the dome-shaped washer 72 through which the shaft 71 of the alternative bolt passes may be threaded or unthreaded. FIG. 6 also suggests how a semi-liquid filler composition 73 might be applied over such a washer 72 and bolt head 16 to a level 77 that corresponds to a roof line 75 of the vehicle. Upon drying, curing, sanding, etc. this filler may be painted to a desired vehicle roof color.

Similarly, the cup 2(*d*) of FIG. 2 may be replaced by an alternative cup 82. Such an alternative cup 82 might, by way of example only, be smaller in size than the cup 2(*d*) of FIG. 2, and provided with a bearing surface on its bottom surface 84, chrome plated, threaded or unthreaded and/or be provided with a flat or countersunk bottom surface 84 to accommodate an alternative nut 86 that cooperates with the threads of the alternative bolt 68. In still another alternative embodiment of this invention, an alternative cup is simply not employed. For example, a shoulder restraint holder device, such as that depicted as item 44 in FIG. 3, could be mounted to the underside 35 of the deformed metal of the cavity by means of a nut 86 that is threaded to the bolt 68 thereby compressing the holder device between the bottom surface 35 of the deformed metal and the top surface of the nut 86.

FIG. 7 illustrates yet another alternative embodiment of this invention wherein the bolt 2(*a*), mandrel 2(*b*), cup 2(*d*) and bolt 2(*e*) used to create the cavity 66 in a vehicle roof may each be replaced by alternative components. One of these alternative components could be another type of alternative bolt 88. This alternative bolt 88 is, again by way of example, shown provided with a slot opening 90 to which a shoulder belt (that can slidingly pass through the slot opening 90), or a shoulder restraint attachment device, such as that depicted by item 44 of FIG. 4, item 50 of FIG. 4, item 58 of FIG. 5, etc., could be attached to said bolt. Such a slot opening 90 could of course also accept other mechanical connection devices such as buckles, keepers, carabiners and the like to form a terminal mounting for a shoulder strap. It should also be specifically noted that, as suggested by direction arrow 92, this alternative bolt 88 passes in an upward direction through a hole 94 in an alternative cup, through the hole 34 in the sheet metal 32, through a hole 98 in an alternative washer 100 and threadedly engages with alternative bolt 102 and thereby anchors the alternative bolt 88 and, hence, any shoulder restraint attachment device connected to said alternative bolt 88.

Those skilled in this art will appreciate that many other methods and devices can be employed in the practice of this invention; consequently the preceding patent disclosure should be regarded as illustrating, but not limiting, the scope of the following claims.

Thus having disclosed this invention, what is claimed is:

1. A shoulder restraint attachment device for anchoring a shoulder restraint to a motor vehicle roof, said device comprising:

(1) a bolt having a head and a threaded shaft capable of passing through a hole in a sheet of metal that constitutes a portion of the motor vehicle roof;

(2) a mandrel having a hole capable of passing the shaft of the bolt, a nose region capable of downwardly deforming a portion of the sheet metal surrounding a hole in the motor vehicle roof to create a downwardly directed cavity having a downwardly directed dome configuration and a curved upper surface region and a countersunk region for receiving a head of the bolt having a curved top surface;

(3) a cup having a hole capable of passing the shaft of the bolt and a downwardly directed interior cavity having a downwardly directed dome configuration that is generally complementary with the size and configuration of the nose region of the mandrel; and (4) a nut having threads capable of threadedly cooperating with the threads of the bolt.

2. A shoulder restraint attachment device for anchoring a shoulder restraint to a motor vehicle roof, said device comprising:

(1) a bolt having a head and a threaded shaft capable of passing through a hole in a sheet of metal that constitutes a portion of the motor vehicle roof;

(2) a mandrel having a top surface region, a countersunk region in said mandrel's top surface region, a hole capable of passing the shaft of the bolt and a nose region capable of downwardly deforming a portion of the sheet metal surrounding a hole in the motor vehicle roof to create a downwardly directed cavity generally having a downwardly directed dome configuration;

(3) a cup having a hole capable of passing the shaft of the bolt and a downwardly directed interior cavity having a downwardly directed dome configuration that is generally complementary with the size and configuration of the nose region of the mandrel;

(4) a nut having threads capable of threadedly cooperating with the threads of the bolt; and (5) a shoulder restraint holder that is mounted on the bolt and positioned between the cup and the nut.

3. A shoulder restraint device that is mounted to a dome shaped cavity in a motor vehicle roof and wherein said device comprises:

(1) a bolt having a threaded shaft capable of passing through a hole in a sheet of metal that constitutes a portion of the motor vehicle roof;

(2) a mandrel having a countersunk region, a hole capable of passing the shaft of the bolt and a nose region capable of downwardly deforming a portion of the sheet metal surrounding the hole in the motor vehicle roof to create a downwardly directed cavity having a downwardly directed dome configuration;

(3) a cup having a hole capable of passing the shaft of the bolt and a downwardly directed interior cavity having a downwardly directed dome configuration that is generally complementary with the size and configuration of the nose region of the mandrel; and (4) a nut having threads capable of threadedly cooperating with the threads of the bolt.

4. A shoulder restraint device that is mounted to a dome shaped cavity in a motor vehicle roof and wherein said device comprises:

(1) a bolt having a threaded shaft capable of passing through a hole in a sheet of metal that constitutes a portion of the motor vehicle roof;

(2) a mandrel having a countersunk region, a hole capable of passing the shaft of the bolt and a nose region capable of downwardly deforming a portion of the sheet metal surrounding the hole in the motor vehicle roof to create a downwardly directed cavity having a downwardly directed dome configuration;

(3) a cup having a hole capable of passing the shaft of the bolt and a downwardly directed interior cavity having a downwardly directed dome configuration that is generally complementary with the size and configuration of the nose region of the mandrel;

(4) a nut having threads capable of threadedly cooperating with the threads of the bolt; and (5) a shoulder restraint device which further comprises a shoulder restraint holder.

5. A shoulder restraint device that is mounted to a dome shaped cavity in a motor vehicle roof and wherein said device comprises:
  (1) a bolt having a threaded shaft capable of passing through a hole in a sheet of metal that constitutes a portion of the motor vehicle roof;
  (2) a mandrel having a countersunk region, a hole capable of passing the shaft of the bolt and a nose region capable of downwardly deforming a portion of the sheet metal surrounding the hole in the motor vehicle roof to create a downwardly directed cavity having a downwardly directed dome configuration;
  (3) a cup having a hole capable of passing the shaft of the bolt and a downwardly directed interior cavity having a downwardly directed dome configuration that is generally complementary with the size and configuration of the nose region of the mandrel;
  (4) a nut having threads capable of threadedly cooperating with the threads of the bolt; and
  (5) wherein the mandrel has a curved upper surface region.

6. A shoulder restraint device that is mounted to a dome shaped cavity in a motor vehicle roof and wherein said device comprises:
  (1) a bolt having a threaded shaft capable of passing through a hole in a sheet of metal that constitutes a portion of the motor vehicle roof;
  (2) a mandrel having a countersunk region, a hole capable of passing the shaft of the bolt and a nose region capable of downwardly deforming a portion of the sheet metal surrounding the hole in the motor vehicle roof to create a downwardly directed cavity having a downwardly directed dome configuration;
  (3) a cup having a hole capable of passing the shaft of the bolt and a downwardly directed interior cavity having a downwardly directed dome configuration that is generally complementary with the size and configuration of the nose region of the mandrel;
  (4) a nut having threads capable of threadedly cooperating with the threads of the bolt; and
  (5) wherein said shoulder restraint device is capable of slidably passing a shoulder strap that is part of a three point restraint system.

7. A shoulder restraint device that is mounted to a dome shaped cavity in a motor vehicle roof and wherein said device comprises:
  (1) a bolt having a threaded shaft capable of passing through a hole in a sheet of metal that constitutes a portion of the motor vehicle roof;
  (2) a mandrel having a countersunk region, a hole capable of passing the shaft of the bolt and a nose region capable of downwardly deforming a portion of the sheet metal surrounding the hole in the motor vehicle roof to create a downwardly directed cavity having a downwardly directed dome configuration;
  (3) a cup having a hole capable of passing the shaft of the bolt and a downwardly directed interior cavity having a downwardly directed dome configuration that is generally complementary with the size and configuration of the nose region of the mandrel;
  (4) a nut having threads capable of threadedly cooperating with the threads of the bolt; and
  (5) wherein said shoulder restraint device is capable of terminally holding an end of a shoulder strap.

* * * * *